United States Patent
Vig et al.

(10) Patent No.: US 10,708,220 B2
(45) Date of Patent: Jul. 7, 2020

(54) SYSTEM AND METHOD FOR DIRECTING A TETHERED DEVICE TO AN IN-VEHICLE STORED LANDING PAGE BASED ON AN AVAILABLE CREDIT OR DATA BALANCE

(71) Applicant: GM Global Technology Operations LLC, Detroit, MI (US)

(72) Inventors: Sandeep Vig, Oakland Township, MI (US); Rajeev Ranjan, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 287 days.

(21) Appl. No.: 15/837,717

(22) Filed: Dec. 11, 2017

(65) Prior Publication Data
US 2019/0182203 A1    Jun. 13, 2019

(51) Int. Cl.
| | |
|---|---|
| *H04L 12/00* | (2006.01) |
| *H04L 29/12* | (2006.01) |
| *H04M 15/00* | (2006.01) |
| *H04W 4/24* | (2018.01) |
| *H04L 29/08* | (2006.01) |

(52) U.S. Cl.
CPC .......... *H04L 61/1511* (2013.01); *H04L 67/02* (2013.01); *H04M 15/80* (2013.01); *H04M 15/8033* (2013.01); *H04M 15/8214* (2013.01); *H04M 15/85* (2013.01); *H04M 15/851* (2013.01); *H04M 15/852* (2013.01); *H04M 15/854* (2013.01); *H04W 4/24* (2013.01); *H04L 67/12* (2013.01)

(58) Field of Classification Search
CPC ............. H04M 15/8033; H04M 15/85; H04M 15/851; H04M 15/852; H04M 15/854; H04M 15/8214; H04M 15/80; H04L 67/12; H04L 61/1511; H04L 67/02; H04W 4/24
USPC ........ 709/225, 223, 217, 238; 707/706, 768; 701/123
See application file for complete search history.

(56) References Cited

U.S. PATENT DOCUMENTS

| | | | | |
|---|---|---|---|---|
| 6,877,002 | B2 * | 4/2005 | Prince | G06F 16/4387 707/749 |
| 7,401,140 | B2 * | 7/2008 | Goulden | G06Q 30/02 709/217 |
| 7,979,457 | B1 * | 7/2011 | Garman | G06Q 10/02 707/768 |
| 8,312,042 | B2 * | 11/2012 | LeBeau | H04M 3/4931 707/782 |
| 8,386,514 | B2 * | 2/2013 | Cheng | H04W 4/021 707/774 |

(Continued)

*Primary Examiner* — Frantz Coby

(57) ABSTRACT

An access system is provided and includes a memory and a control module. The memory stores a local DNS server VM, LLPS VM and local landing page, where the local DNS server VM is programmed with an IP address and a domain name of the LLPS VM. The control module: transmits a HTTP request from an in-vehicle device to a network application server via a PDN gateway or GGSN; based on a network event, receives a redirect response signal to redirect the in-vehicle device from accessing the network application server to receiving the landing page; based on a URI of the landing page, provides a query request signal to the local DNS server VM for the IP address and the domain name of a network or local landing page server; receives a query response signal from the local DNS server VM and the landing page from the LLPS VM.

18 Claims, 4 Drawing Sheets

(56) References Cited

U.S. PATENT DOCUMENTS

| | | | | |
|---|---|---|---|---|
| 8,458,161 B2* | 6/2013 | Schneider | ......... | H04L 29/12594 |
| | | | | 707/706 |
| 8,706,909 B1* | 4/2014 | Nickson | .............. | H04L 67/2814 |
| | | | | 709/245 |
| 9,400,564 B2* | 7/2016 | Chou | .................... | G06F 3/0483 |
| 9,471,697 B2* | 10/2016 | Lortz | .................... | H04W 76/14 |
| 9,596,287 B2* | 3/2017 | Rybak | .................... | G07C 5/008 |
| 2005/0038894 A1* | 2/2005 | Hsu | ........................ | G06Q 30/02 |
| | | | | 709/228 |
| 2008/0046550 A1* | 2/2008 | Mazur | .................... | H04L 41/12 |
| | | | | 709/223 |
| 2008/0059607 A1* | 3/2008 | Schneider | ........... | G06F 16/2425 |
| | | | | 709/218 |
| 2010/0106854 A1* | 4/2010 | Kim | .................. | H04L 29/12066 |
| | | | | 709/238 |
| 2011/0071997 A1* | 3/2011 | Sullivan | .............. | G06F 16/9566 |
| | | | | 707/706 |
| 2014/0040348 A1* | 2/2014 | Kirsch | ............... | G06Q 10/0833 |
| | | | | 709/203 |
| 2015/0185034 A1* | 7/2015 | Abhyanker | ............ | G01C 21/36 |
| | | | | 701/23 |

* cited by examiner

SYSTEM AND METHOD FOR DIRECTING A TETHERED DEVICE TO AN IN-VEHICLE STORED LANDING PAGE BASED ON AN AVAILABLE CREDIT OR DATA BALANCE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems for directing traffic to a landing page server of an automotive supplier.

An automotive vehicle may have an infotainment system and/or an access device (e.g., a router) that provides access to the Internet. The infotainment system may include a display via which a user may access, for example, an application or website via the Internet. The access device may operate as an access point and allow personal devices, such as a mobile device, a cellular phone, a tablet, and/or a laptop computer to wirelessly access the Internet. In order for Internet services to be provided to the vehicle, a subscription with a carrier (e.g., AT&T® or Verizon®) is created with an owner of the vehicle and/or one or more of the personal devices.

The services are typically available as long as the owner has a balance (or certain amount of credit) available with the carrier. For example, the owner may pay for a predetermined amount of data (e.g., 10 gigabytes Gb) per month and as a result the owner has a balance with the carrier. If the predetermined amount of data is used, then services may not be provided until additional data is purchased. In this situation, the infotainment system and/or the personal devices may be directed to a landing page of a remote network landing page server of, for example, an automotive manufacturer. The landing page may be displayed on the infotainment system and/or the personal devices and indicate that the owner has used the predetermined amount of data and Internet services has been stopped.

SUMMARY

An access system is provided and includes a memory and a control module. The memory is configured to store a local domain name system server virtual machine (VM), a local landing page server VM, and a local landing page. The local domain name system server VM is programmed with an Internet protocol (IP) address and a domain name of the local landing page server VM. The control module is configured to: transmit a hypertext transfer protocol request from an in-vehicle device to a network application server via a packet data network (PDN) gateway or a gateway general packet radio server (GPRS) support node (GGSN); and based on a network event, receive a redirect response signal from the PDN gateway or the GGSN to redirect the in-vehicle device from accessing the network application server to receiving the local landing page or a network landing page. The redirect response signal includes a uniform resource identifier of the local landing page or the network landing page. The control module is further configured to: based on the uniform resource identifier, provide a first query request signal to the local domain name system server VM for the IP address and the domain name of a network landing page server or the local landing page server VM; receive a first query response signal from the local domain name system server VM including the IP address and the domain name; contact the local landing page server VM based on the first query response signal; and subsequent to contacting the local landing page server VM, receive the local landing page from the local landing page server VM.

In other features, the network event corresponds to at least one of: an amount of credit an owner of the in-vehicle device has with a carrier; the in-vehicle device being out of a predetermined network and is in a roaming state; a contract service term between the owner and the carrier has expired; or a carrier network where the in-vehicle device is located has insufficient resources to accommodate communication of the in-vehicle device.

In other features, the control module is configured to receive the landing page from the local landing page server VM instead of from a network landing page system server.

In other features, the local domain name system server VM is configured to: based on the uniform resource identifier, determine whether the landing page is stored in the memory; if the landing page is stored in the memory, provide the IP address to the control module; and if the landing page is not stored in the memory, transmit the first query request signal to a network domain name system server to obtain an IP address of the network landing page server.

In other features, the control module is further configured to: prior to transmitting the hypertext transfer protocol request to the PDN gateway or the GGSN, transmit a second query request signal to a network domain name system server to obtain a second IP address of the network application server; and receive a second query response from the network domain name system server including the second IP address.

In other features, the control module is configured to: subsequent to receiving the second query response and when an owner of the in-vehicle device has a predetermined amount of credit with a carrier, (i) transmit a second hypertext transfer protocol request from the in-vehicle device to the network application server, and (ii) receive a hypertext transfer protocol response from the application server based on the second hypertext transfer protocol request; and receive the redirect response signal from the PDN gateway when the owner has less than the predetermined amount of credit with the carrier.

In other features, the control module is configured to: in response to receiving the first query response signal, provide a second request signal to the local landing page server VM; in response to the second request signal, receive a certificate from the local landing page server VM; determine whether the certificate is authentic; and if the certificate is authentic, display the landing page on a display of the in-vehicle device.

In other features, the control module is configured to: in response to receiving the first query response signal, provide a second request signal to the local landing page server VM; and in response to the second request signal, receive a second response signal from the local landing page server VM including a certificate. The control module is further configured to, based on the response signal, determine whether the local landing page server VM is authorized including verifying at least one of: a domain name or IP address provided with the certificate; an authority entity or authority device indicated on the certificate, where the authority device is operated by the authority entity and is authorized to generate or encrypt a signature of the certificate; the certificate or signature is authentic; a hashing algorithm used to hash data in the certificate; or an encryption algorithm used to encrypt the signature.

In other features, the local landing page server VM has a same domain name as the domain name of the network landing page server.

In other features, the landing page server VM hosts cryptographic information including private keys, public keys and a server certificate. The server certificate is identical to a certificate of a network landing page server.

In other features, the landing page server VM hosts cryptographic information including private keys, public keys and a server certificate. The server certificate is a shared certificate used for a plurality of services in the access system.

In other features, the landing page server VM hosts the local landing page and the local landing page: indicates an owner of the in-vehicle device has less than a predetermined amount of credit with a carrier; includes a link to a website or an application enabling the owner to increase the amount of credit with the carrier; indicates the in-vehicle device is out of a predetermined network and is in a roaming state; indicates a contract service term between the owner and the carrier has expired; or indicates a carrier network where the in-vehicle device is located has insufficient resources to accommodate communication of the in-vehicle device.

In other features, the in-vehicle device is an onboard device or a mobile device.

In other features, the in-vehicle device includes the memory and the control module.

In other features, a method of operating an access system is provided. The method includes: transmitting a hypertext transfer protocol request to a network application server via a PDN gateway or a GGSN; based on a network event, receive a redirect response signal from the PDN gateway or the GGSN to redirect an in-vehicle device from accessing the network application server to receiving a landing page, where the redirect response signal includes a uniform resource identifier of the landing page; based on the uniform resource identifier, providing a first query request signal to the local domain name system server VM for an IP address of a network landing page server or a local landing page server VM; receiving a first query response signal from the local domain name system server VM including the IP address; contacting the local landing page server VM based on the first query response signal; and subsequent to contacting the local landing page server VM, receiving the landing page from the local landing page server VM.

In other features, the network event corresponds to at least one of: an amount of credit an owner of the in-vehicle device has with a carrier; the in-vehicle device being out of a predetermined network and is in a roaming state; a contract service term between the owner and the carrier has expired; or a carrier network where the in-vehicle device is located has insufficient resources to accommodate communication of the in-vehicle device.

In other features, the method further includes: in response to receiving the first query response signal, providing a second request signal to the local landing page server VM; in response to the second request signal, receiving a certificate from the local landing page server VM; determining whether the certificate is authentic; and if the certificate is authentic, displaying the local landing page on a display of the in-vehicle device.

In other features, the method further includes: in response to receiving the first query response signal, providing a second request signal to the local landing page server VM; in response to the second request signal, receiving a certificate from the local landing page server VM; determining whether the local landing page server VM is authorized; and based on whether the local landing page server VM is authorized, providing a certificate response signal to the local landing page server VM.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
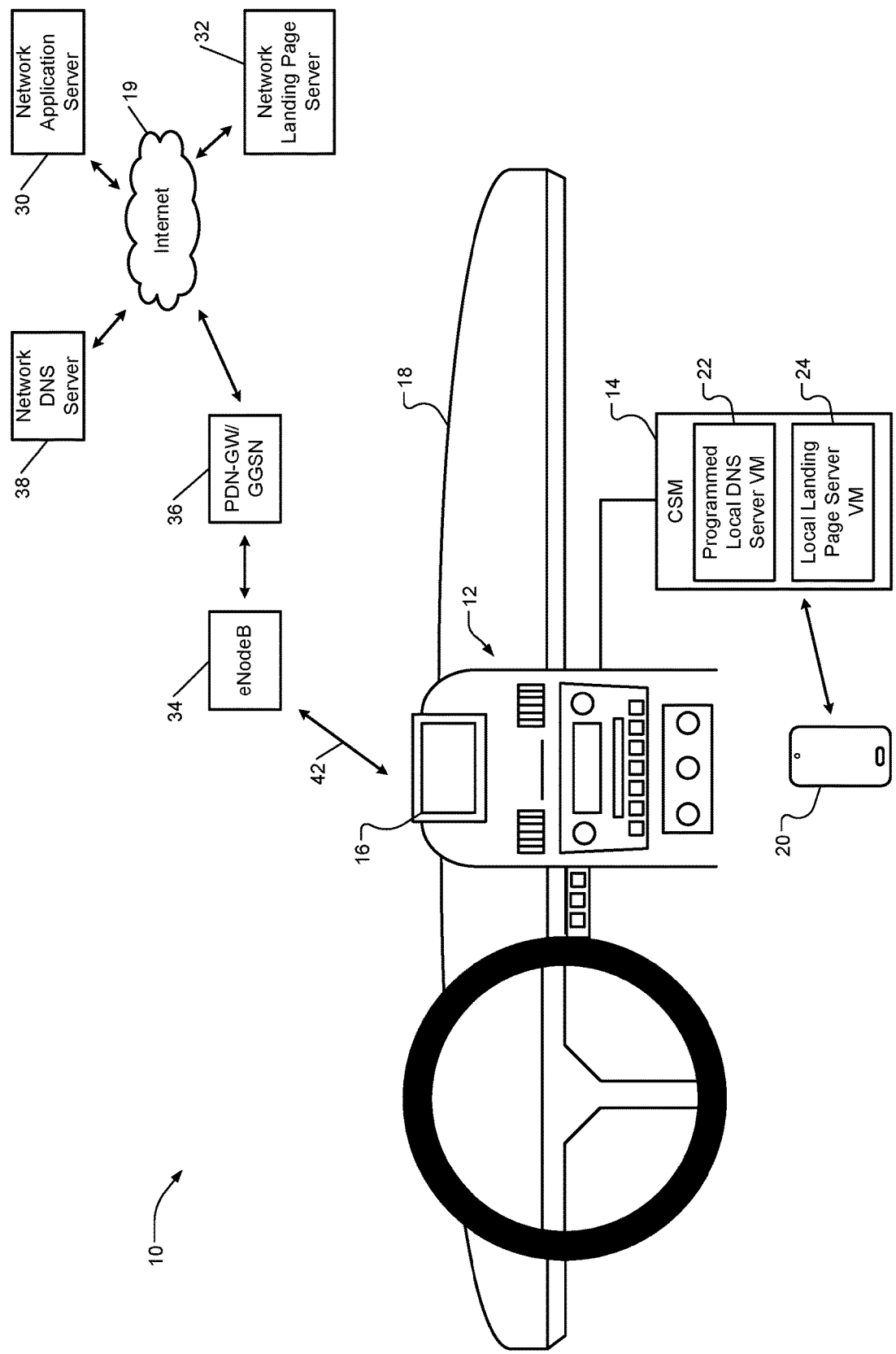
FIG. 1 shows a functional block diagram of an example access system including a programmed local DNS server virtual machine (VM) and a local landing page server VM located in a vehicle in accordance with an embodiment of the present disclosure

An owner of an onboard device (e.g., an infotainment system) or a tethered device (e.g., a personal mobile device) located in a vehicle may access the Internet based on an amount of available credit the owner has with a carrier. The onboard device may be an onboard processor, a onboard physical machine, or a virtual machine implemented by an onboard processor and memory. Examples of personal devices include a mobile device, a cellular phone, a tablet, a laptop, a wearable device, etc. When the owner has used a predetermined amount of data, access to the Internet may be prevented. The onboard device or tethered device may then be directed to a landing page of a remote network landing page server of, for example, an automotive manufacturer.

The traffic associated with the displaying of the landing page on the infotainment system and/or the personal device is often paid for by the automotive manufacturer. This traffic can include: the onboard device or tethered device generating and transmitting a domain name system (DNS) query request signal to a network DNS server to obtain an Internet protocol (IP) address of the landing page; the network DNS server transmitting a DNS query response signal including the IP address of the landing page to the onboard device or tethered device; the onboard device or tethered device transmitting a logon signal to the remote server; and the remote server transmitting the landing page to the onboard device or tethered device. The remote server may also send a certificate to the onboard device or tethered device to be authenticated. the onboard device or tethered device sending an authentication response signal to the remote server. Although the amount of data transferred to display the landing page is minimal per occurrence, the cost can be considerable over time and especially when this occurs for thousands of vehicles.

The examples set forth below include systems and methods for directing an in-vehicle device (e.g., an onboard device or a tethered device) to a landing page accessible within a vehicle without being directed to a remote server. The landing page is stored in a local landing page server VM of the vehicle and is accessed via the in-vehicle device. This eliminates the traffic transmitted between a vehicle (or a tethered device within the vehicle) and a remote server of an automotive manufacturer. In addition, an authorization and authentication process is disclosed that allows the in-vehicle device to operate as if being directed to a landing page of a remote server. This allows the in-vehicle device to determine whether the local landing page server VM is an authorized server in a similar manner as when the in-vehicle device determines whether the remote server is an authorized server. The disclosed processes do not affect operations of: carriers; external/remote network devices, such as a packet data network gateway (PDN-GW), a gateway general packet radio service (GPRS) support node (GGSN), a remote network DNS server, and a remote landing page server of an automotive manufacturer; and/or content providers of websites and/or network application servers. Thus, devices of the carriers, the external/remote network devices, and devices of the content providers do not need updated provisions to comply with the disclosed processes.

FIG. 1 shows an example access system 10 including an infotainment system 12 that includes a central stack module 14 and a display 16, which are centrally located on a dashboard 18 of a vehicle. The infotainment system 12 may provide access to an Internet 19 or other distributed network. Website pages may be shown on the display 16. The display 16 may be, for example, a touchscreen. The central stack module (CSM) 14 may be implemented within the infotainment system 12, access the Internet 19, control access to the Internet 19 for one or more user devices, and communicate with the one or more user devices. The user devices may include a mobile device, a cellular phone, a laptop computer, a tablet, a wearable device, etc. An example of a user device is shown as tethered device 20, which is shown as a smart phone. The user devices may operate as tethered devices and may access the Internet 19 via the CSM 14. The CSM 14 and/or a portion thereof may be referred to as an onboard device and may operate as a wireless access point for the user devices.

The CSM 14, as shown, may include a first virtual machine (VM) operating as a programmed local DNS server (designated as programmed local DNS server VM 22) and a second VM operating as a local landing page server (designated as local landing page server VM 24). The servers 22, 24 are used when a network event occurs, such as when a financial condition exists for an owner of the vehicle and/or the user devices. A financial condition may refer to when the owner no longer has a balance or credit with a carrier, for example, when the owner has used paid for data and/or network time and thus is out of data. Another example of a financial condition may arise when, for example, the owner is traveling between geographical regions and enters a geographical region in which carrier costs are different. When this condition arises, the CSM 14 may indicate lack of a balance by displaying a selected one of multiple landing pages on the display 16. The landing pages include static content. Although different landing pages may apply for different situations, the content of each of the landing pages does not change for extended periods of time. In a roaming situation, the CSM 14 may indicate to the owner via a landing page displayed on the display 16 and/or the user devices that charges (or data rates) may be different due to being in a different geographical location. As still another network event example, when the vehicle travels to a location for which a carrier does not have a roaming agreement to provide services or the roaming charges are different, a landing page may be displayed indicating that service is unavailable or charges are different in the current geographical location. Operation of the CSM 14 and user devices are further described below.

The CSM 14 may communicate with network application servers (e.g., an example network application server 30 is shown) and a network landing page server 32. This communication may include transfer of signals via, for example, a base station (identified as evolved Node B (eNodeB) 34 in FIG. 1) and a PDN-GW or GGSN (hereinafter "PDN-GW/GGSN") 36. Signals may be transmitted from the PDN-GW/GGSN 36 to the network application server 30, the network landing page server 32 and a network DNS server 38 via the Internet 19. The CSM 14 may communicate with the base station eNodeB 34 via an IP channel on an wireless interface link represented by arrow 42. The PDN-GW/GGSN 36 is controlled by a carrier and monitors for financial conditions. The PDN-GW/GGSN 36 may block traffic and redirect an onboard device and a tethered device to a landing page when a financial condition is detected. The network DNS server 38 receives domain names from the onboard and/or tethered devices and in response provides IP addresses back for access to websites and/or landing pages. The network landing page server 32 may store landing pages that are provided to the onboard and tethered devices when financial conditions arise.

Figure 2:
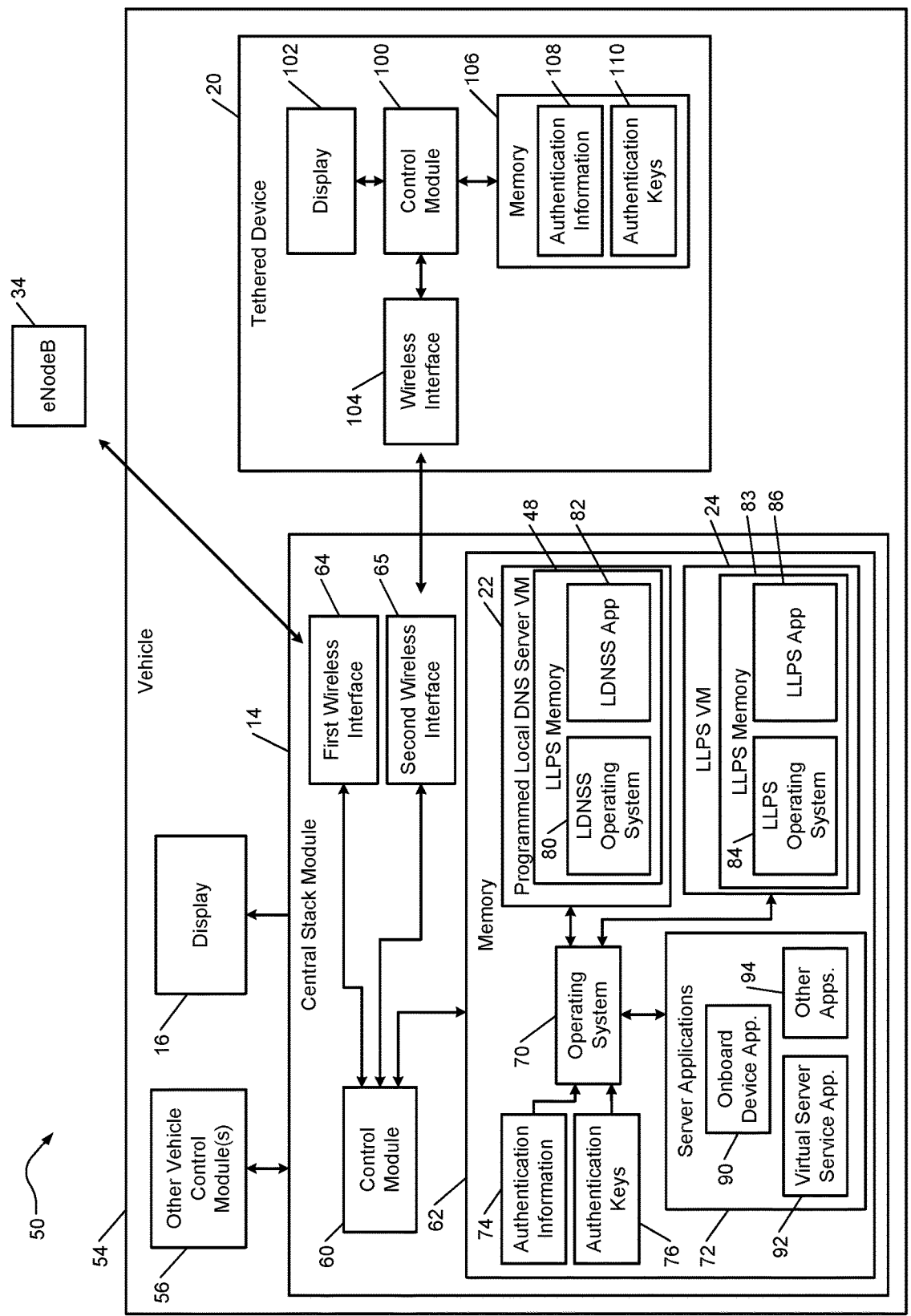
FIG. 2 shows a functional block diagram of a portion of the example access system of FIG. 1 illustrating an example central stack module and another tethered device in accordance with an embodiment of the present disclosure.

FIG. 2 shows a portion 50 of the access system 10 of FIG. 1. The portion 50 includes the base station eNodeB 34 and an in-vehicle access system 52 including the CSM 14 and the tethered device 20. The CSM 14 and the tethered device 20 are shown in a vehicle 54. The CSM 14 is connected to the display 16, which may operate as one of multiple input devices to the CSM 14. The vehicle 54 may include other vehicle control modules 56, such as an engine control module, a heating ventilation and air conditioning (HVAC) control module, an accessory control module, etc., which may be connected to the CSM 14 directly and/or via a controller area network (CAN).

The CSM 14 includes a control module 60, a memory 62, a first wireless interface 64 and a second wireless interface 65. The first wireless interface 64 may be a cellular or broadband network transceiver, a wide area network (WAN) transceiver, a transceiver that satisfies, for example, the long-term evolution (LTE) standard and/or the IEEE 802.11, IEEE 802.15, and/or IEEE 802.16 standards, and/or other type of transceiver configured to wirelessly communicate with the base station 34. The second wireless interface 65 may be a short range or wireless local area network (WLAN) transceiver (e.g., a Bluetooth® low energy transceiver or a wireless fidelity (Wi-Fi®) transceiver) that satisfies, for example, the Institute of Electrical and Electronics Engineers (IEEE) 802.15.1 standard or the IEEE 802.11x standard and/or other type of transceiver configured to wirelessly communicate with the tethered device 20.

The memory 62 may include a volatile or nonvolatile memory, cache or other type of memory. The memory 62 stores the server VMs 22, 24, an operating system 70, server applications 72, security information 74 and security keys 76. The programmed local DNS server VM 22 may include a local DNS server memory 78 that stores a local DNS server (LDNSS) operating system 80 and a LDNSS application 82. The programmed local DNS server VM 22 may direct a tethered device to a landing page of the local landing page server (LLPS) VM 24. The LLPS VM 24 may include a LLPS memory 83 that stores a LLPS operating system 84 and a LLPS application 86. The CSM 14 communicates over a communication channel with a distributed communication network via the wireless interface 64 and/or wirelessly with the tethered device 20 via the wireless interface 65.

The server applications 72 may include an onboard device application 90, a virtual server service application 92 and/or other applications 94, such as an entertainment application, an HVAC application, a global positioning system or navigation system application, etc. The security information 74 may include: names of authorities; names of authorities valid for encrypting a certificate and/or signing a certificate; a valid encrypted or decrypted certificate signature; a hashing algorithm; indicators to determine if a valid hashing algorithm or signature encryption algorithm has been used; etc. The security keys 76 may include private keys and public keys.

The control module 60 executes the operating system 70 and one or more of the server applications 72. The virtual server service application 92, which is implemented in a virtualization layer and is executed along with the OS 70. The virtual server service application 92 creates a virtual environment in which VM (or guest) OSs (e.g., the LDNSS operating system and the LLPS operating system) run.

The tethered device 20 may include a control module 100, a display 102, a wireless interface 104 and a memory 106. The wireless interface 104 may be a short range or WLAN transceiver (e.g., a Bluetooth® low energy transceiver or a Wi-Fi® transceiver) that satisfies, for example, the IEEE 802.15.1 standard or the IEEE 802.11x standard and/or other type of transceiver configured to wirelessly communicate with the tethered device 20. The memory 106 includes security information 108 and security keys 110. The control module 100 communicates with the CSM 14 via the wireless interface 104 and may access the Internet 19 and servers 30, 32, 38 via the control module 60. The security information 108 and the security keys 110 may match and/or be similar to the security information 74 and the security keys 76.

Figure 3:
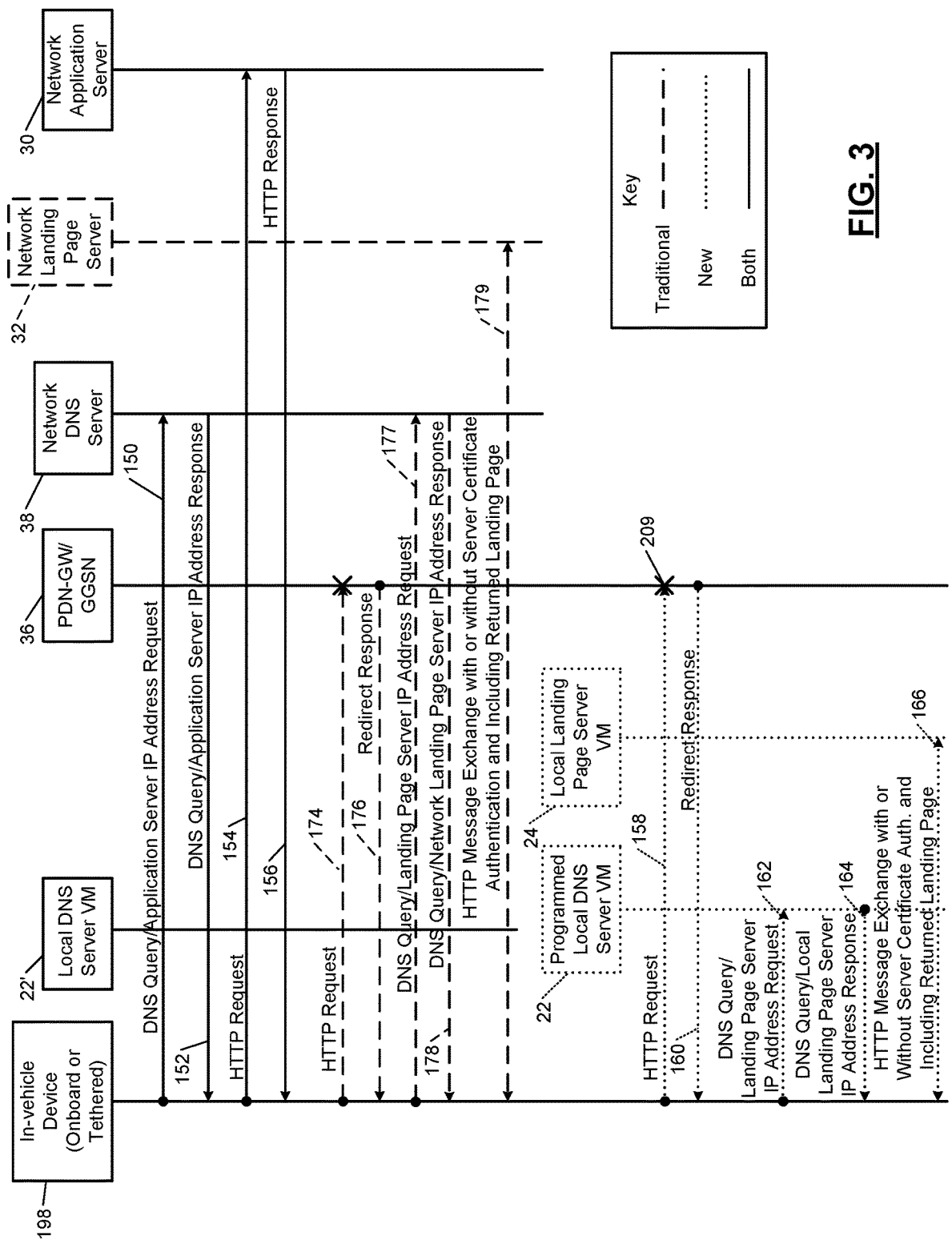
FIG. 3 shows an example signal diagram illustrating signals transmitted during an application access process, a local landing page access process and an authorization and authentication process in accordance with an embodiment of the present disclosure.

FIG. 3 shows an example signal diagram illustrating signals transmitted during an application access process, a landing page access process and an authorization and authentication process. The application access process includes signals 150, 152, 154, 156, which are represented by solid lines. The local landing page access process includes signals 158, 160, 162, 164, 166, which are represented by dotted line. The authorization and authentication process may include signal 166. FIG. 3 further shows a traditional landing page access process as signals 174, 176, 177, 178 and 179, which are represented by dashed lines. The application access process may be performed prior to local landing page access process and/or the traditional landing page access process. The signal diagram is further described with respect to the method illustrated in FIG. 4.

Figure 4:
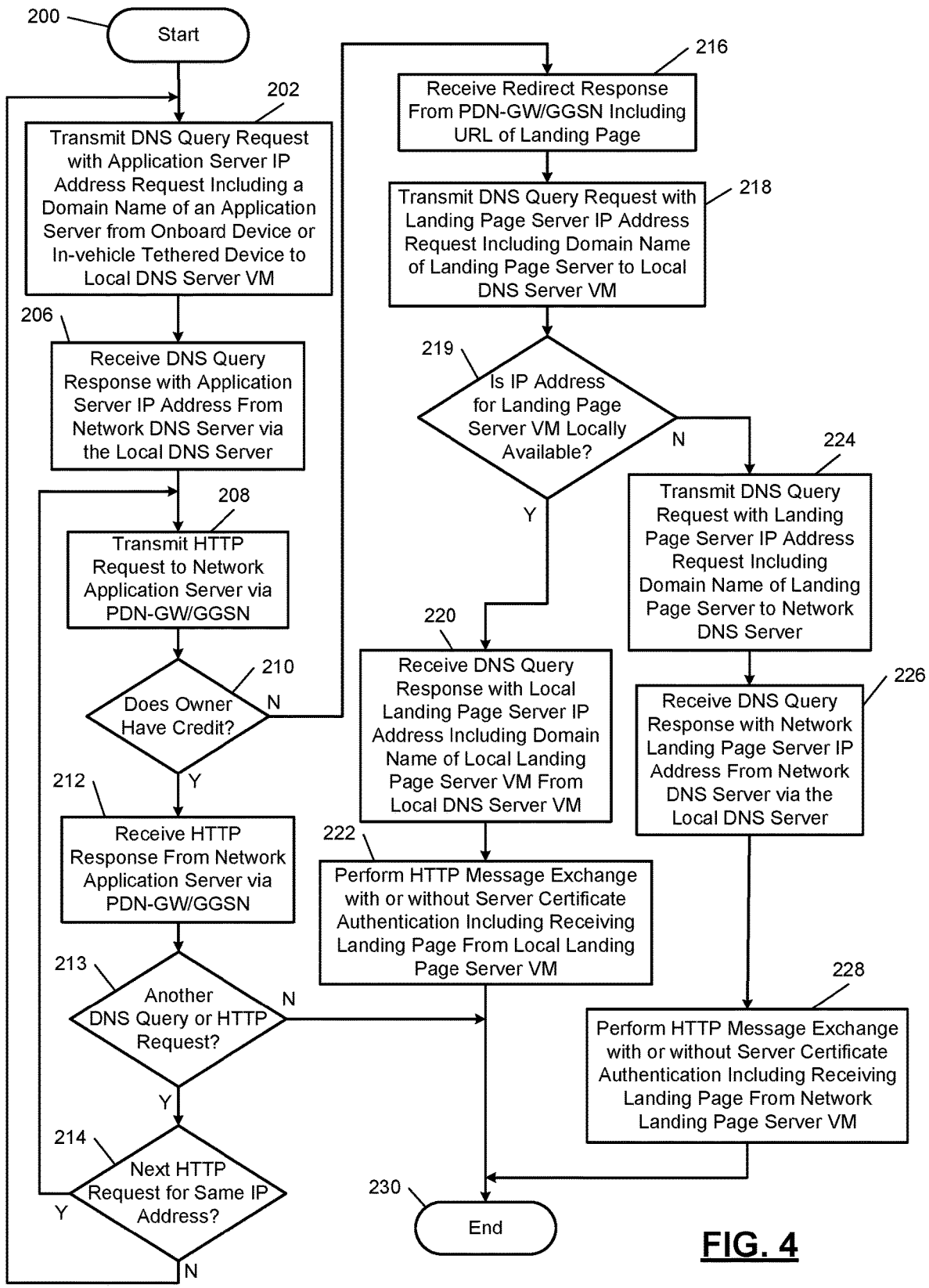
FIG. 4 is a logic flow diagram illustrating the local landing page access process including the authorization and authentication process in accordance with an embodiment of the present disclosure.

FIG. 4 shows the local landing page access process including the authorization and authentication process. The onboard devices and tethered devices disclosed herein may be operated, as an example according to the method illustrated in FIG. 4. An example of the onboard device is the control module 60 of FIG. 2 implementing the onboard device application 90. The tethered devices include the tethered device 20 of FIG. 2. An in-vehicle device 198 is shown in FIG. 3 and represents any of the stated onboard devices and tethered devices. Although the following operations are primarily described with respect to the implementations of FIGS. 1-3, the operations may be easily modified to apply to other implementations of the present disclosure. The operations may be iteratively performed.

The method may begin at 200. At 202, a DNS query request with an application server IP address request including a domain name of an application server (e.g., the network application server 30) is sent from one of the in-vehicle device 198 to the local DNS server VM 22', which then forwards the application server IP address request to the network DNS server 38 via the PDN-GW/GGSN 36 of FIG. 1. This is represented by signal 150. The local DNS server VM 22' may perform traditionally as a relay device. For example, the local DNS server VM 22' may perform as a relay device during transmission of the signals. In an embodiment of the present disclosure, the local DNS server VM 22' may be: programmed; operate as a smart device; be configured as described above with respect to FIG. 2; and operate as described below with respect to signals 158, 160, 162, 164, 166. This is represented by the programmed local DNS server VM 22. The local DNS server VM 22' and/or the programmed local DNS server VM 22 may operate as described with respect to the signals 150, 152, 154, 156.

The DNS query request may include a domain name for a website of the network application server 30 and requests an IP address of the network application server corresponding to the domain name. The DNS query request may originate in, for example, the control module 60 or the control module 100 and be transmitted via one of the wireless interfaces 64, 104, which operate as transceivers. Although the following operations are primarily described with respect to the in-vehicle device 198 transmitting and receiving various signals, these signals are transmitted and received by the corresponding one of the control modules 60, 100 via the corresponding one of the wireless interfaces 64, 104.

At 206, the in-vehicle device 198 receives a DNS query response including the application server IP address from the network DNS server 38 via the local DNS server VM 22'. This is represented by signal 152. The DNS query response may be passed through the PDN-GW/GGSN 36 and/or the local DNS server VM 22' prior to being provided to the in-vehicle device 198. The DNS query response may include the domain name and IP address of the website of the network application server 30.

At 208, the in-vehicle device 198 transmits a hypertext transfer protocol (HTTP) request signal to a network application server (e.g., the network application server 30 of FIG. 1) associated with the network application server IP address. The HTTP request may be for a file or a response from the network application server. This is represented by signal 154.

At 210, the PDN-GW/GGSN 36, which may comply with provisions of a carrier, monitors signals transmitted to the network DNS server and determines whether the owner of the device that transmitted the DNS query request has credit (e.g., a balance of funds, data and/or network usage time remaining) with the carrier. This is represented by point 209 in FIG. 3. When the owner has credit, operation 212 is performed, otherwise operation 216 is performed. When the owner has credit, the HTTP request signal is permitted to pass to the network application server, as illustrated by the HTTP request signal 154.

At 212, the in-vehicle device 198 is configured to receive a HTTP response from the network application server. The HTTP response may include the requested file. This is represented by signal 156. The HTTP response may be received via the PDN-GW/GGSN 36.

At 213, the in-vehicle device 198 determines whether there is another DNS query for another network application server IP address or another HTTP request for the same previous network application server IP address. If there is another DNS query or HTTP request then operation 214 is performed, otherwise the method may end at 230.

At 214, the in-vehicle device 198 determines whether there is another HTTP request for the same previous network application server IP address. If there is another HTTP request for the same network application server IP address, then operation 208 is performed, otherwise operation 202 is performed.

Referring now to FIG. 3, when the PDN-GW/GGSN 36 receives an HTTP request (e.g., the HTTP request represented by dashed signal line 174) and determines that the owner does not have credit, the PDN-GW/GGSN 36 may send a redirect response signal (e.g., redirect response signal represented by dashed signal line 176) back to the in-vehicle device 198. The redirect response signal may include a uniform resource locator (URL) or a uniform resource identifier (URI) that includes a domain name of a network landing page server 32 and location or address where the landing page is stored on the network landing page server 32. Based on the redirect response signal, the in-vehicle device 198 sends a DNS query including a request for an IP address of the landing page server to the network DNS server 38. This is represented by signal line 177. The network DNS server 38 then transmits a DNS query response signal back to the in-vehicle device 198 that includes the IP address for the landing page at then network landing page server 32. This is represented by dashed signal line 178.

A HTTP message exchange between the in-vehicle device 198 and the network landing page server 32 may be performed. This is represented by signal line 179. This exchange may include the in-vehicle device 198 sending a request for the landing page to the network landing page server 32 and the network landing page server 32 sending the landing page to the in-vehicle device 198. Prior to sending the request for the landing page, the in-vehicle device 198 may authenticate a certificate received from the network landing page server 32, and then be directed to the landing page. The landing page may indicate to the owner that the owner no longer has credit and/or service is not available in the geographical region in which the vehicle is located. Other information pertaining to a corresponding network event may also or alternatively be displayed. See above-described network events. For this reason, the landing page may also indicate that network services have been stopped, such that the in-vehicle device 198 is unable to access a network application server (e.g., the network application server 30). The signals transmitted between the in-vehicle device 198 and the network landing page server 32 may be at the expense of an automotive manufacturer of the network landing page server 32. To eliminate this expense and to more efficiently send a landing page to the in-vehicle device 198, the landing page and authorization and authentication processes associated with signals 158, 160, 162, 164, 166 are performed.

Referring again to FIGS. 1-4, at 216, when the PDN-GW/GGSN 36 receives a HTTP request signal (e.g., signal 158) and determines that the owner does not have credit with the carrier, the PDN-GW/GGSN 36 generates a redirect response signal, which is received at the in-vehicle device 198. This is represented by signal 160. The redirect response signal includes a URL or URI that includes a domain name of the network landing page server 32 and location or address where the landing page is stored on the network landing page server 32.

At 218, the in-vehicle device 198 transmits or provides a DNS query request with a landing page server IP address request including a domain name of the landing page server (i.e. the domain name of the local landing page server VM 24 and the network landing page server 32, which share the same domain name) to the programmed local DNS server VM 22. This is represented by signal 162 in FIG. 3 and may be based on the URL or URI. This may include (i) the onboard device application 90 executed on the control module 60 providing the DNS query to the LDNSS application 82, or (ii) the control module 100 transmitting the DNS query to the programmed local DNS server VM 22.

At 219, the programmed local DNS server VM 22 determines whether a local IP address for the LLPS VM 24 is locally available (i.e. stored in the memory 62). If the IP address is locally available, then the landing page is locally stored in and/or accessible to the LLPS VM 24. If the IP address is locally available, then operation 220 is performed, otherwise operation 224 is performed.

At 220, the in-vehicle device 198 receives or obtains the DNS query response with IP address for the local landing page of the LLPS VM 24 including the domain name of the local landing page serer VM 24 from the LDNSS application 82 of the programmed local DNS server VM 22. This is represented by signal 164. The programmed local DNS server VM is programmed to provide the IP address for the LLPS VM 24.

At 222, the in-vehicle device 198 and the LLPS VM 24 perform an HTTP message exchange. This is represented by signal line 166. This exchange may include the in-vehicle device 198 sending a request for the landing page to the LLPS VM 24 and the LLPS VM 24 sending the landing page to the in-vehicle device 198. Different landing pages may be provided for different network events. The provided landing page may be a same landing page that would be provided if the landing page was provided by the network landing page server 32. Any number of vehicles may store the landing pages stored by the network landing page server 32.

Prior to sending the request for the landing page, the in-vehicle device 198 may authenticate a certificate received from the LLPS VM 24, and then be directed to the landing page. The landing page may indicate information regarding a corresponding network event to the owner. For example, the landing page may indicate that the owner no longer has credit and/or service is not available in the geographical region in which the vehicle is located. For this reason, the landing page may also indicate that network services have been stopped, such that the in-vehicle device 198 is unable to access a network application server (e.g., the network application server 30). Since the signals transmitted between the in-vehicle device 198 and the LLPS VM 24 are within the vehicle, transmission of these signals is not at the expense of an automotive manufacturer. If the certificate is authenticated, then the landing page may then be obtained and displayed on the display 16 or 102. If the authentication of a certificate is not performed, then the landing page may be displayed on the display 16 or 102.

In response to receiving a certificate, the control module 60 or 100 of the in-vehicle device 198 may then compare information on the certificate and/or other security information with security information stored at the memory 62 or 106. As an example, the certificate may include: a domain name of the network landing page server 32 and/or other domain names, an IP address of the network landing page server 215; a signature; an identifier of an authority entity (e.g., a person, business or third party authorized to encrypt the certificate) and/or an authority device (e.g., a control module or processor owned and/or operated by the person, business, or third party) that created and/or encrypted the signature; and other security information disclosed herein. In an embodiment, the other domain names include the domain name of the local landing page server VM, a domain name of an application server (e.g., the network application server 30), and/or other domain names.

In an embodiment, a certificate received by the in-vehicle device 198 and/or control module 60 may be a shared certificate that is used for different services of the access system. For example a certificate can be used by a client application included as one of the other applications 94, when setting up a secure connection with the network application server 30. In this case the certificate is used as a client certificate in order for network application server 30 to authenticate the client application or the user of the client application. The same certificate may also include the domain name of the local landing pager server VM 24 so that it can be used by the in-vehicle device to authenticate the local landing page server VM 24. In this case, this certificate is used as a server certificate. As a result, the same certificate may be used for multiple purposes. The certificate may be stored in the memory 62 and domain names may be added to the certificate, as the domain names are determined. The public/private keys corresponding to the shared certificate may be stored as part of the authentication keys 76 in the memory 62.

In another embodiment, the landing page server VM 24 hosts cryptographic information, such as private keys, public keys, and the certificate (may be referred to as a "server certificate"). The server certificate may be identical to the certificate provided by the network landing page server 32. The server certificate may be a shared certificate used for multiple services and/or purposes, as described above.

The in-vehicle device 198 may determine whether the LLPS VM 24 is authorized by: confirming whether a domain name and/or IP address provided with the certificate is correct; determining whether a valid hashing algorithm has been used to hash the data included in the certificate; determining whether the signature included in the certificate and/or other data has been encrypted using the appropriate encryption algorithm; decrypting and verifying the signature and/or other data; and determining whether the authority entity of the authority device indicated by the certificate and/or the LLPS VM 24 are valid. The signature and encryption verification may be based on whether an appropriate private-public key pair was used to encrypt the signature and/or other data in the certificate. The control module 60 or 100 may decrypt the signature and/or other data using a public key stored in the memory 62 or 106 and/or received from an authority certificate to verify the signature, data, and/or key pair used for encryption. A reference domain name, a reference decrypted signature, and IDs of the authority entity and the authority device may be stored in the memory 62 or 106 and compared to that provided with the certificate. The reference domain name may be the domain name of the network landing page server 32.

The reference domain name provided with the certificate may be a same domain name as the domain name of the network landing page server 32. The signature may be a same signature provided by the network landing page server 32. The IDs of the authority entity and authority device may be the same as indicated by the network landing page server 32. By providing a same domain name and/or signature and providing a same identifier of an authority entity and/or authority device, the LLPS VM 24 may be viewed from the in-vehicle device 198 as being the network landing page server 32. As a result, the in-vehicle device 198 determines that the LLPS VM 24 is authorized. The in-vehicle device 198 communicates with the LLPS VM 24 as if the LLPS VM 24 was the network landing page server 32. If the LLPS VM 24 is determined to be authorized, then the landing page can be received.

During the exchange, the in-vehicle device 198 receives or obtains a landing page from the LLPS VM 24. The landing page is similar to the landing page provided by the network landing page server 32 and includes an indication that the owner no longer has a credit with the carrier and/or has an insufficient balance to perform the communication and/or data transfer being attempted. The landing page may include a statement indicating to the owner how to check and/or increase the owner's balance. For example, the landing page may include a link to another website and/or to execute an application via which the owner can check and provide funds to increase the balance.

If the received certificate is not authenticated, the in-vehicle device 198 may generate an error signal indicating that a LLPS (or LLPS VM) has not been determined to be authorized. If an error signal is generated, then the landing page is not displayed on the 16 or 102. The owner may then: cease operation; exit out, log back in and reattempt above process; initiate an application to add credit with the carrier; and/or perform other operations to increase credit and/or identify the LLPS VM 24 as authorized.

At 224, the in-vehicle device 198 may send, via the local DNS server 22 and PDN-GW/GGSN 36, a DNS query request for the IP address of the landing page including the domain name of the landing page server to the network DNS server 38, as described above and as illustrated by signal line 177. At 226, the network DNS server 38 may transmit a request response signal, via the PDN-GW/GGSN 36 and local DNS server 22, back to the in-vehicle device 198. The request response signal includes the IP address for the local landing page server. This is illustrated by signal line 178.

At 228, the in-vehicle device 198 performs an HTTP message exchange with the landing page server 32. This may be done with or without server certification as described above. During this exchange, the landing page is sent from the network landing page server 32 to the in-vehicle device 198. Subsequent to the operations associated with 222 and 228, the method may end at 230.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. An access system comprising:
   a memory configured to store a local domain name system server virtual machine (VM), a local landing page server VM, and a local landing page, wherein the local domain name system server VM is programmed with an Internet protocol (IP) address and a domain name of the local landing page server VM; and a control module configured to
- transmit a hypertext transfer protocol request from an in-vehicle device to a network application server via a packet data network (PDN) gateway or a gateway general packet radio server (GPRS) support node (GGSN),
- based on a network event, receive a redirect response signal from the PDN gateway or the GGSN to redirect the in-vehicle device from accessing the network application server to receiving the local landing page or a network landing page, wherein the redirect response signal includes a uniform resource identifier of the local landing page or the network landing page,
- based on the uniform resource identifier, provide a first query request signal to the local domain name system server VM for the IP address and the domain name of a network landing page server or the local landing page server VM,
- receive a first query response signal from the local domain name system server VM including the IP address and the domain name,
- contact the local landing page server VM based on the first query response signal, and
- subsequent to contacting the local landing page server VM, receive the local landing page from the local landing page server VM.

2. The access system of claim 1, wherein the network event corresponds to at least one of:
- an amount of credit an owner of the in-vehicle device has with a carrier;
- the in-vehicle device being out of a predetermined network and is in a roaming state;
- a contract service term between the owner and the carrier has expired; or
- a carrier network where the in-vehicle device is located has insufficient resources to accommodate communication of the in-vehicle device.

3. The access system of claim 1, wherein the control module is configured to receive the local landing page from the local landing page server VM instead of from a network landing page system server.

4. The access system of claim 1, wherein the local domain name system server VM is configured to:
- based on the uniform resource identifier, determine whether the local landing page is stored in the memory;
- if the local landing page is stored in the memory, provide the IP address to the control module; and
- if the local landing page is not stored in the memory, transmit the first query request signal to a network domain name system server to obtain an IP address of the network landing page server.

5. The access system of claim 1, wherein the control module is further configured to:
- prior to transmitting the hypertext transfer protocol request to the PDN gateway or the GGSN, transmit a second query request signal to a network domain name system server to obtain a second IP address of the network application server; and
- receive a second query response from the network domain name system server including the second IP address.

6. The access system of claim 5, wherein the control module is configured to:
- subsequent to receiving the second query response and when an owner of the in-vehicle device has a predetermined amount of credit with a carrier, (i) transmit a second hypertext transfer protocol request from the in-vehicle device to the network application server, and (ii) receive a hypertext transfer protocol response from the network application server based on the second hypertext transfer protocol request; and
- receive the redirect response signal from the PDN gateway when the owner has less than the predetermined amount of credit with the carrier.

7. The access system of claim 1, wherein the control module is configured to:
- in response to receiving the first query response signal, provide a second request signal to the local landing page server VM;
- in response to the second request signal, receive a certificate from the local landing page server VM;
- determine whether the certificate is authentic; and
- if the certificate is authentic, display the local landing page on a display of the in-vehicle device.

8. The access system of claim 1, wherein the control module is configured to:
- in response to receiving the first query response signal, provide a second request signal to the local landing page server VM;
- in response to the second request signal, receive a second response signal from the local landing page server VM including a certificate; and
- based on the response signal, determine whether the local landing page server VM is authorized including verifying at least one of
- a domain name or IP address provided with the certificate,
- an authority entity or authority device indicated on the certificate, wherein the authority device is operated by the authority entity and is authorized to generate or encrypt a signature of the certificate,
- the certificate or signature is authentic,
- a hashing algorithm used to hash data in the certificate, or
- an encryption algorithm used to encrypt the signature.

9. The access system of claim 1, wherein the local landing page server VM has a same domain name as the domain name of the network landing page server.

10. The access system of claim 1, wherein:
- the landing page server VM hosts cryptographic information including private keys, public keys and a server certificate; and
- the server certificate is identical to a certificate of a network landing page server.

11. The access system of claim 1, wherein:
- the landing page server VM hosts cryptographic information including private keys, public keys and a server certificate; and
- the server certificate is a shared certificate used for a plurality of services in the access system.

12. The access system of claim 1, wherein:
- the landing page server VM hosts the local landing page; and
- the local landing page
  - indicates an owner of the in-vehicle device has less than a predetermined amount of credit with a carrier,
  - includes a link to a website or an application enabling the owner to increase the amount of credit with the carrier,
  - indicates the in-vehicle device is out of a predetermined network and is in a roaming state, indicates a contract service term between the owner and the carrier has expired, or indicates a carrier network where the in-vehicle device is located has insufficient resources to accommodate communication of the in-vehicle device.

13. The access system of claim 1, wherein the in-vehicle device is an onboard device or a mobile device.

14. The access system of claim 1, wherein the in-vehicle device includes the memory and the control module.

15. A method of operating an access system, the method comprising:
   transmitting a hypertext transfer protocol request to a network application server via a packet data network (PDN) gateway or a gateway general packet radio server (GPRS) support node (GGSN);
   based on a network event, receive a redirect response signal from the PDN gateway or the GGSN to redirect an in-vehicle device from accessing the network application server to receiving a landing page, wherein the redirect response signal includes a uniform resource identifier of the landing page;
   based on the uniform resource identifier, providing a first query request signal to a local domain name system server virtual machine (VM) for an Internet protocol (IP) address of a network landing page server or a local landing page server VM;
   receiving a first query response signal from the local domain name system server VM including the IP address;
   contacting the local landing page server VM based on the first query response signal; and
   subsequent to contacting the local landing page server VM, receiving the landing page from the local landing page server VM.

16. The method of claim 15, wherein the network event corresponds to at least one of:
   an amount of credit an owner of the in-vehicle device has with a carrier;
   the in-vehicle device being out of a predetermined network and is in a roaming state;
   a contract service term between the owner and the carrier has expired; or
   a carrier network where the in-vehicle device is located has insufficient resources to accommodate communication of the in-vehicle device.

17. The method of claim 15, further comprising:
   in response to receiving the first query response signal, providing a second request signal to the local landing page server VM;
   in response to the second request signal, receiving a certificate from the local landing page server VM;
   determining whether the certificate is authentic; and
   if the certificate is authentic, displaying the landing page on a display of the in-vehicle device.

18. The method of claim 15, further comprising:
   in response to receiving the first query response signal, providing a second request signal to the local landing page server VM;
   in response to the second request signal, receiving a certificate from the local landing page server VM;
   determining whether the local landing page server VM is authorized; and
   based on whether the local landing page server VM is authorized, providing a certificate response signal to the local landing page server VM.

* * * * *